United States Patent [19]
Chou et al.

[11] Patent Number: 5,579,436
[45] Date of Patent: Nov. 26, 1996

[54] RECOGNITION UNIT MODEL TRAINING BASED ON COMPETING WORD AND WORD STRING MODELS

[75] Inventors: Wu Chou, Piscataway; Biing-Hwang Juang, Warren, both of N.J.

[73] Assignee: Lucent Technologies Inc., Murray Hill, N.J.

[21] Appl. No.: 30,895

[22] Filed: Mar. 15, 1993

Related U.S. Application Data

[63] Continuation-in-part of Ser. No. 846,484, Mar. 2, 1992.
[51] Int. Cl.[6] .................................. G10L 5/04; G10L 5/06
[52] U.S. Cl. .......................... 395/2.53; 395/2.65; 395/2.45
[58] Field of Search ...................... 395/2, 2.4, 2.49–2.53, 395/2.6, 2.64, 2.65, 2.54; 381/41–43

[56] References Cited

U.S. PATENT DOCUMENTS

| | | | |
|---|---|---|---|
| 4,817,156 | 3/1989 | Bahl et al. | 395/2.53 |
| 5,280,563 | 1/1994 | Ganong | 395/2 |
| 5,315,689 | 5/1994 | Kanazawa et al. | 395/2.53 |

*Primary Examiner*—David D. Knepper
*Attorney, Agent, or Firm*—Thomas A. Restaino; Kenneth M. Brown

[57] ABSTRACT

A system pattern-based speech recognition, e.g., a hidden Markov model (HMM) based speech recognizer using Viterbi scoring. The principle of minimum recognition error rate is applied by the present invention using discriminative training. Various issues related to the special structure of HMMs are presented. Parameter update expressions for HMMs are provided.

23 Claims, 6 Drawing Sheets

RECOGNITION UNIT MODEL TRAINING BASED ON COMPETING WORD AND WORD STRING MODELS

CROSS-REFERENCE TO RELATED APPLICATION

This application is a continuation-in-part of commonly assigned U.S. patent application Ser. No. 07/846,484 filed Mar. 2, 1992 which is currently pending.

FIELD OF THE INVENTION

The present invention relates to the field of speech recognition generally, and more particularly to the field of speech recognizer training.

BACKGROUND OF THE INVENTION

Speech recognition is a process by which an unknown speech utterance (usually in the form of a digital PCM signal) is identified. Generally, speech recognition is performed by comparing the features of an unknown utterance to the features of known words or word strings.

Features of known words or word strings are determined with a process known as training. Through training, one or more samples of known words or strings (training speech) are examined and their features (or characteristics) recorded as reference patterns (or recognition unit models) in a database of a speech recognizer. Typically, each recognition unit model represents a single known word. However, recognition unit models may represent speech of other lengths such as subwords (e.g., phones, which are the acoustic manifestation of linguistically-based phonemes). Recognition unit models may be thought of as building blocks for words and strings of words, such as phrases or sentences.

To recognize an unknown utterance, a speech recognizer extracts features from the utterance to characterize it. The features of the unknown utterance are referred to as a test pattern. The recognizer then compares combinations of one or more recognition unit models in the database to the test pattern of the unknown utterance. A scoring technique is used to provide a relative measure of how well each combination of recognition unit models matches the test pattern. The unknown utterance is recognized as the words associated with the combination of one or more recognition unit models which most closely matches the unknown utterance.

There are many types of speech recognizers, e.g., template-based recognizers and hidden Markov model (HMM) recognizers. Recognizers trained using first-order statistics based on known word samples (e.g., spectral means of such samples) to build recognition unit models are known as template-based recognizers. Typically, scoring is accomplished with a time registration technique, such as dynamic time warping (DTW). DTW provides an optimal time alignment between recognition unit models (templates) and test patterns by locally shrinking or expanding the time axes of the templates and the pattern until one optimally matches the other. DTW scoring reflects an overall distance between optimally aligned templates and the test pattern. The template or sequence thereof having the lowest score among all such templates or sequences (i.e., the shortest distance between itself and the test pattern) identifies the test pattern.

Recognizers trained using both first and second order statistics (i.e., spectral means and variances) of known speech samples are known as HMM recognizers. Each recognition unit model in this type of recognizer is an N-state statistical model (an HMM) which reflects these statistics. Each state of an HMM corresponds in some sense to the statistics associated with the temporal events of samples of a known word or subword. An HMM is characterized by a state transition matrix, A (which provides a statistical description of how new states may be reached from old states), and an observation probability matrix, B (which provides a description of which spectral features are likely to be observed in a given state). Scoring of a test pattern reflects the probability of the occurrence of the sequence of features of the test pattern given a particular model. Scoring across all models may be provided by efficient dynamic programming techniques, such as Viterbi scoring. The HMM or sequence thereof which indicates the highest probability of the sequence of features in the test pattern occurring identifies the test pattern.

In addition to template- and HMM-based recognizers, other recognizers includes those which use neural networks as recognition unit models.

Generally, the performance of speech recognizers is closely associated with the effectiveness of the techniques used to train their recognition unit models. Conventional training of, for example, HMM speech recognizers is based on the principle of statistical data fitting which concerns increasing the likelihood that a particular HMM will match the statistics of known recognition unit samples. The success of conventional HMM training is conditioned on the availability of large amounts of training speech samples and proper choice of HMMs. Often, the amount of available training speech is limited, and the assumptions made by chosen HMMs on the speech production process are often inaccurate. As a consequence, likelihood-based training of HMMs may not be very effective. The deficiency of conventional training methods is due to the lack of a direct relation between training and recognition error rate. To illustrate this deficiency, a conventional HMM-based speech recognizer will now be considered in greater detail.

In conventional HMM based speech recognizers, a continuous speech utterance waveform is blocked into frames, and a discrete sequence of feature vectors, $X=\{x_0, x_1, \ldots, x_{T(x)}\}$, is extracted, where $T(x)$ corresponds to the total number of frames in the speech signal (input speech utterance may be identified as its feature vector sequence $X=\{x_0, x_1, \ldots, x_{T(x)}\}$ without confusion).

In the framework of the HMM, the input speech feature vector sequence X is modeled as a noisy observation of the outcomes from a certain discrete time Markov chain from time $t=1, \ldots, T(x)$. Every possible state transition sequence during the time $t=1, \ldots, T(x)$ constitutes a path through the trellis determined by this Markov chain. The probability density function of observing vector x in the j-th state of i-th word HMM (observation probability density) is $$b_j^i(x) = \sum_{k=1}^{L} c_{j,k}^i N(x, \mu_{i,j,k}, V_{i,j,k}); \qquad (1)$$

which is a mixture of Gaussian distributions, where $c_{j,k}^i$ are mixture weights which satisfy the criterion $$\sum_{k=1}^{L} c_{j,k}^i = 1. \qquad (2)$$

The optimal path under Viterbi scoring is the one that attains the highest log-likelihood score. If $\Theta^i$ denotes the optimal path of the input utterance X in i-th word HMM $\lambda_i$, then the log-likelihood score of the input utterance X along its optimal path in i-th model $\lambda_i$, $g_i(X, \lambda_i)$, can be written as $$g_i(X, \Lambda) = \log f(X, \Theta^i | \lambda_i) \tag{3}$$

$$= \log b^i_{\theta_0}(x_0) + \sum_{t=1}^{T(X)} \log a^i_{\theta_{t-1}\theta_t} + \sum_{t=1}^{T(X)} \log b^i_{\theta_t}(x_{\theta_t}), \tag{4}$$

where $\Theta^i_t$ is the corresponding state sequence along the optimal path $\theta^i_t$, $x_t$ is the corresponding observation vector at time t, T(X) is the number of frames in the input utterance X, and $a_{\theta_{t-1}{}^i \theta_t{}^i}$ is the state transition probability from state $\theta_{t-1}{}^i$ to state $\theta_t{}^i$.

In the recognition part of an HMM-based isolated word recognizer using Viterbi scoring, the input utterance is first processed, and the log-likelihood score of the input utterance X at each word model along its optimal path is evaluated. The recognizer classifies the input utterance to the i-th word $W_i$ if and only if $i=\mathrm{argmax}_j g_j(X, \lambda_j)$. If the recognition error count function for i-th word is defined as:

$$\hat{l}_i(X, \lambda_i) = \begin{cases} 1 & X \in W_i \text{ and } i \neq \mathrm{argmax}_j g_j(X; \lambda_j) \\ 0 & \text{otherwise,} \end{cases} \tag{5}$$

then the goal of training an HMM is to reduce the expected error rate:

$$L(\Lambda) = E\left[\sum_{k=1}^{W} \hat{l}_k(X, \lambda_k)\right], \tag{6}$$

where the expectation is with respect to X. In practice, the training result is often measured by an empirical error rate for a given set of training speech samples $\{X_n, n=1,2,\ldots,N\}$:

$$L_0 = \frac{1}{N} \sum_{n=1}^{N} \sum_{k=1}^{W} \hat{l}_k(X_n, \lambda_k). \tag{7}$$

However, direct minimization of the empirical error rate function (7) has several serious deficiencies. It is numerically difficult to optimize, because classification error count function is not a continuous function. The empirical error rate function does not distinguish near miss and barely correct cases; this may impair recognizer recognizer performance on an independent test data set. Viterbi scoring also add a complexity here, since the form and the value of the empirical error rate function vary with segmentation determined by the HMM parameters. A set of numerically optimal HMM parameters based on the current segmentation does not maintain its optimality under a different segmentation, unless a good convergence result can be proved. It has been a problem of standing interest to find a training method that directly minimizes the recognition error rate and is consistent with HMM framework using Viterbi scoring.

The objective of continuous speech recognition is to identify (i.e., recognize) an underlying word sequence (i.e., string) from an input speech utterance. As discussed above, recognition is performed with use of a set of recognition unit models. Recently, significant research effort has been concentrated on the problem of how to select and represent these speech recognition unit models for use in continuous speech recognition.

One assumption generally made in continuous speech recognition is that a fluently spoken word string may be adequately represented by a linear concatenation of speech recognition unit models (of, e.g., words or subwords) according to a lexical transcription of the words in the string. Conventionally, this has meant a concatenation of recognition unit models trained directly from segmented training tokens (such as words). Segmentation of training speech into tokens corresponding to recognition unit models is generally unreliable, calling into question the validity of the recognition unit models themselves. However, building a model for each possible string, as distinct from models describing components of strings, has been avoided since the number of possible word strings (as distinct from words or subwords) is large.

Training of recognition unit models in isolation is not consistent with the way in which continuous speech recognition is done. In continuous speech recognition, scoring is performed on a string level. That is, recognition is predicated on how well a concatenation of recognition unit models compares with and entire unknown word string. One concatenation of models will be selected over another based on how well each of the concatenations compares in the aggregate to the unknown string. This aggregate comparison may be referred to as a global score of the concatenation. Thus, should a continuous speech recognizer make an error, it does so based on comparisons made at a global or "string" level, not at a "word" or "subword" (i.e., "substring") level. Yet, it is the substring level at which these recognition unit models have been trained. Recognition unit models which have been trained at a substring level may not be well suited for use at a string level.

Because of this discrepancy in training and recognition philosophy, as well as the difficulty in accurately locating and segmenting word or subword boundaries, continuous speech recognizer performance may be less than desirable.

SUMMARY OF THE INVENTION

The present invention provides a training method and apparatus for speech recognition which reduces (e.g., minimizes) either word or word string recognition error rate. The invention is applicable to a wide variety of speech and speaker recognition systems, such as, e.g., neural network-, template-, and HMM-based speech recognizers.

A first illustrative embodiment of the invention for an HMM speech recognizer minimizes word level recognition error rate through the use of a misrecognition measure embedded in a smooth loss function. The misrecognition measure of the embodiment indicates the likelihood that a recognizer having given training will misrecognize an utterance (i.e., commit an error based on its present state of training). In this embodiment, the misrecognition measure reflects the difference between (i) a recognizer score for a known training utterance based on the correct recognition unit model for that utterance, and (ii) an average of the sum of one or more scores for the training utterance based upon one or more other recognition unit models. The loss function establishes a relationship between expected word recognizer error and competing recognition unit model scoring differential. Thus, the minimization of expected word error may be directly related to the maximization of scoring differential between a correct recognition unit model and other competing recognition unit models for a given training utterance. The loss function of the embodiment provides a good approximation of the word recognition error count—a function which is inherently not continuous—so that a sequential training method for HMMs using Viterbi decoding can lead to enhanced recognition performance. Furthermore, it characterizes the decision rule in a smooth functional form, allowing the use of numerical search techniques to achieve an optimal separation of likelihood scores, effectively distinguishing "near miss" and "barely correct" cases.

The first illustrative embodiment of the invention may be initialized from a recognition unit model database of a given recognizer, regardless of whether the recognition unit models of the given recognizer have been directly generated from a training source with (non-optimal) linear segmentation or trained according to other criteria. The embodiment provides adaptive adjustments (or updates) to HMM parameters to achieve an enhanced configuration with maximum possible separation between competing words. It can be used either off-line or on-line, and can learn new features from a new training source to adapt models to the target application.

A second illustrative embodiment of the present invention provides a technique suitable for training speech recognition unit models at a global string level so as to reduce, e.g., minimize, string recognition error rate. The invention applies discriminative analysis to string level acoustic model matching. The invention is applicable to a wide variety of speech processing systems, including speech and speaker recognition systems using any recognition unit models, such as templates or HMMs.

According to the second illustrative embodiment of the invention, a set of confusable (or "competing") string models is generated based on a single lexical string from a training database. Given a training string token from the training database, speech recognition unit model parameters are estimated so as to enhance the probability that the lexical string model will exhibit the best recognition score among the set of confusable string models given the training string. In this way, string recognition error rate is reduced.

Parameter estimation providing minimized string recognition error rate obtained with the use of a specially designed loss function. This loss function accommodates string level allophonic variations in speech recognition unit models by taking into account the competing string models from the string level acoustic manifestations. By establishing a relationship between expected string recognition error and competing string model scoring differential, the minimization of expected error may be directly related to the maximization of scoring differential between the lexical string model and other confusable string models.

DETAILED DESCRIPTION

I. Illustrative Embodiment Hardware

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIGS. 1, 2, and 3 (or 4, 5, and 6) may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Use of DSPs is advantageous since the signals processed represent real physical signals and processes, such as speech signals, room background noise, etc.

II. A First Illustrative Embodiment

Figure 1:
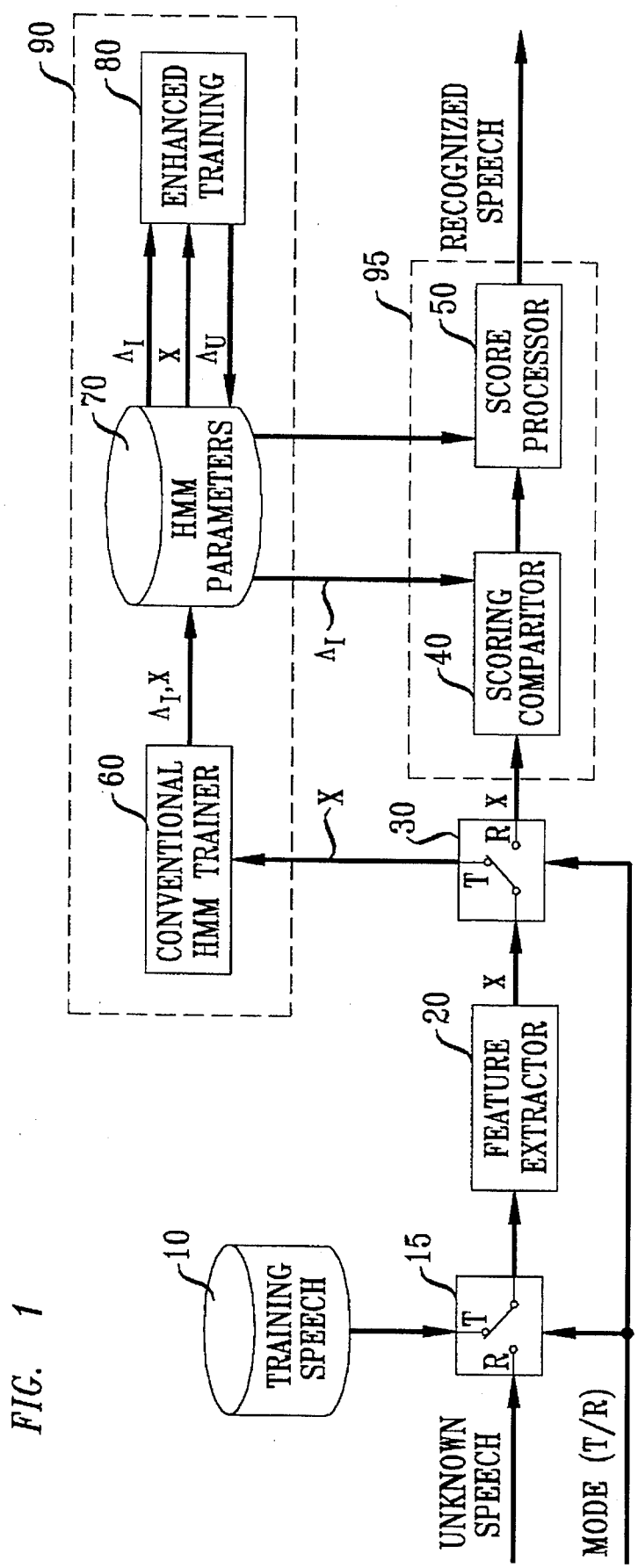
FIG. 1 presents an illustrative HMM-based speech recognition system according to the first embodiment of the present invention.

An illustrative enhanced trainer embodiment of the present invention is shown in FIG. 1 in the context of a speech recognizer. The embodiment operates on real physical speech signals (e.g., pulse code modulated (PCM) speech) in both training and recognition modes, and provide identified speech, also in digital form, as output. The system of FIG. 1 includes a training speech database 10, a feature extractor 20, mode switches 15, 30, a scoring comparator 40, score processor 50, conventional trainer 60, HMM parameter (pattern) database 70 and an enhanced trainer 80.

The training speech database 10 of system 1 comprises samples of known speech signals in digital form. These samples are used for the purposes of the conventional and enhanced trainers 60, 80, respectively. Samples of known speech from database 10 are provided to other components of the system 1 via mode switch 15.

Mode switch 15 reflects two operational modes of system 1: a training (T) mode and a recognition (R) mode. When switch 15 is in the T position (or state), training speech from database 10 may be provided to the balance of the system 1 such that training may be performed by training section 90. When switch 15 is in the R position, unknown speech utterances (signals) in digital form are provided to the balance system 1 for recognition by recognition section 95.

The feature extractor 20 of system 1 is coupled to mode switch 15. Depending on the state of mode switch 15, extractor 20 will receive either training or unknown speech signals. Based on these received speech signals, extractor 20 produces one or more feature vectors, X, characterizing the received speech. Feature extractor 20 may be any of the conventional feature extractors, such as, e.g., a filter bank feature extractor, a linear predictive coding (LPC) feature extractor, or a discrete Fourier transform (DFT) feature extractor.

Feature vectors output from extractor 20 are provided to a second mode switch 30. This mode switch 30 operates in tandem with mode switch 15. That is, both switches are set to the same state—T or R—at the same time based upon a mode signal provided to both switches 15, 30. Mode switch 30 directs the output of the extractor 20 to either the recognition or training section of system 1.

The recognition section 95 of system 1 comprises a scoring comparator 40 and a score processor 50. The scoring comparator 40 relates trained patterns (in this case, HMM models) to unknown speech utterance signals, and determines a score indicating the closeness of the comparison. Conventional HMM scoring comparators employing log-likelihood Viterbi scoring may be used for comparator 40. See, U.S. Pat. No. 4,783,804, entitled "Hidden Markov Model Speech Recognition Arrangement", which is commonly assigned with the present application and incorporated by reference as if fully set forth herein. Scores produced by comparator 40 are provided to the score processor 50. Score processor 50 determines which of the provided scores is greatest and identifies the HMM which is responsible for that score. The unknown speech signal is then recognized by processor 50 as the known speech associated with the identified HMM. Processor 50 obtains representations of identified speech for output from HMM parameter database 70 (see below).

The training section 90 of system 1 comprises a conventional HMM trainer 60, an HMM parameter database 70 and enhanced trainer 80. HMM trainer 60, such as, e.g., that described by U.S. Pat. No. 4,783,804, provides conventional training of HMMs. The output of trainer 60 comprises a set of one or more conventionally trained HMMs, $\Lambda_I$, as well as the feature vectors, X, of training speech on which the set of HMMs are based. For purposes of the illustrative embodiment of the present invention, the degree of training provided by conventional trainer 60 is unimportant. Conventional trainer 60 may, for example, provide an initial set of HMM parameters, $\Lambda_I$, (even if trivial) which have been retrieved from read-only memory.

The output of trainer 60 is recorded in HMM database 70 for use by enhanced trainer 80 as initialization parameters. Enhanced trainer 80 receives $\Lambda_I$ and X and returns to database 70 a set of enhanced or updated HMMs, $\Lambda_U$. Ultimately, enhanced models, $\Lambda_U$, are provided to scoring comparator 40 during recognition mode. The scoring comparator's 40 use of enhanced HMMs, $\Lambda_U$, rather than conventionally trained HMMs, $\Lambda_I$, provides for a reduced speech recognition error rate.

Figure 2:
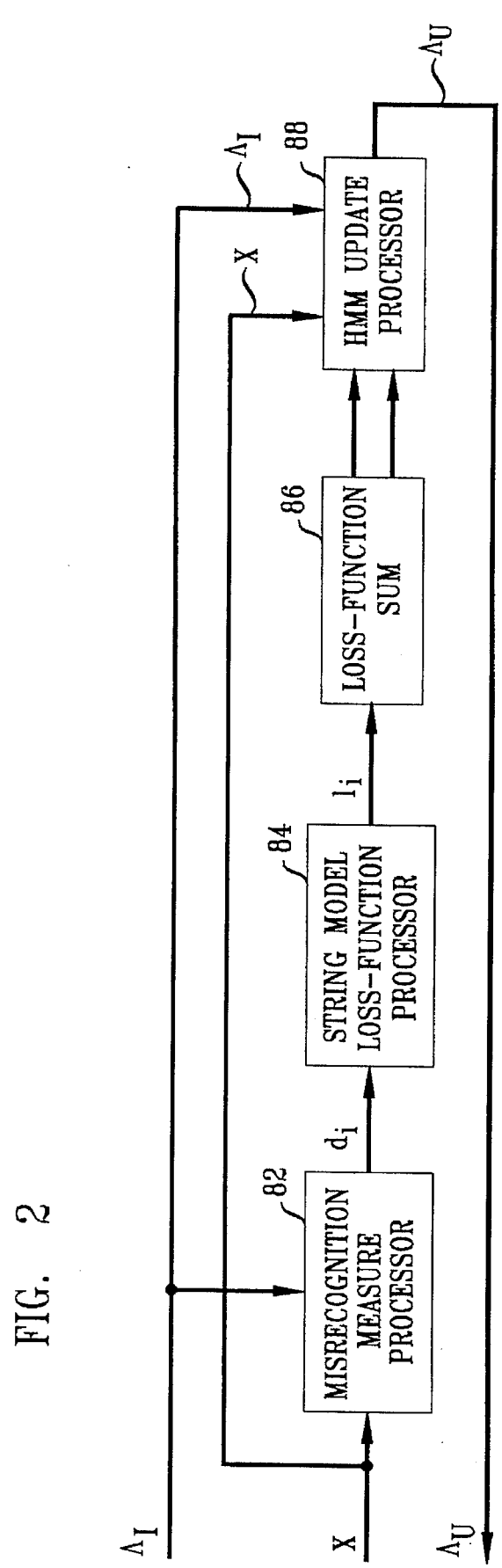
FIG. 2 presents an illustrative enhanced trainer of FIG. 1.

FIG. 2 presents an illustrative embodiment of the enhanced trainer 80 appearing in FIG. 1. Enhanced trainer 80 operates on a schedule of training speech provided by HMM parameter database 70. This schedule defines the number of individual training speech samples, N, used by the trainer 80 in providing an updated $\Lambda_I:\Lambda_U$. As a result of processing N samples of training speech, enhanced trainer 80 returns the updated set of HMM parameters, $\Lambda_U$, to HMM parameter database 70. $\Lambda_U$ may then be used subsequently during recognition mode as a set of recognizer 1 reference patterns, or as a new $\Lambda_I$ to be updated further as a result of processing the same or additional training speech.

For purposes of explanation clarity and computational simplicity, the HMM update processor is illustratively described as processing one training speech sample at a time (i.e., N=1). With a slight modification to be described below (see Discussion section), the embodiment can update $\Lambda_I$ based on several training speech samples (i.e., N>1).

Referring to FIG. 2, enhanced trainer 80 comprises a misrecognition measure processor 82, a word loss function processor 84, a loss function sum 86, and an HMM update processor 88.

A. Misrecognition Measure Processor

Misrecognition measure processor 82 receives HMM parameters, $\Lambda_I$, and a training speech sample, X, from database 70. Based on the sample, X, and $\Lambda_I$, $\lambda_i \in \Lambda_I$, processor 82 determines a misrecognition measure, $d_i(X,\Lambda)$:

$$d_i(X, \Lambda) = -g_i(X, \lambda_i) + \log \left[ \frac{1}{W-1} \sum_{j \neq i} e^{g_j(X,\lambda_j)\eta} \right]^{\frac{1}{\eta}} \quad (8)$$

where $g_j(X,\lambda_j)$ is the log-likelihood recognizer score of the input utterance in the j-th word model, $\eta$ is a positive number illustratively set to 2 and W is the total number of words. As $\eta$ approaches infinity, the misrecognition measure:

$$d_i(X,\Lambda) = -g_i(X,\lambda_i) + \max_{j \neq i} g(X,\lambda_j) \quad (9)$$

in the limit, and only the correct and most confusable words are considered. The separation between a correct word and other competing words is measured by the misrecognition measure. Misrecognition measure $d_i(X,\Lambda) \gg 0$ indicates a misrecognition has been observed, which means that $g_i(X, \lambda_i)$ is significantly smaller than $\max_{j \neq i} g(X,\lambda_j)$. Moreover, the sign and absolute value of the misrecognition measure, $d_i(X,\Lambda)$, imply the near miss and barely correct cases.

Misrecognition measure processor 82 determines the value of a scalar, $d_i$, for use by the subsequent processors shown in FIG. 2. This is done by evaluating (8) given X and $\Lambda_I$. However, the functional relationship of the misrecognition measure (8) also provides the basis of the across-word adjustment training of the parameters of $\Lambda_I$ by taking into account competing words (when embedded in the loss function (10) described below; see HMM Update Processor section, below).

The scalar $d_i(X,\Lambda)$ is provided as an output of the misrecognition measure processor 82 for input to the word-loss function processor 84.

B. Word-Loss Function Processor

Word-loss function processor 84 evaluates a smooth loss function, $l_i$, based on the scalar value $d_i(X,\Lambda)$:

$$l_i(d_i(X, \Lambda)) = \frac{1}{1 + e^{-\gamma d_i(X,\Lambda)}}, \quad (10)$$

where $\gamma$ is illustratively set to 1.

Processor 84 provides scalar $l_i$ as output to training population loss function processor 86.

Parameters $\gamma$ and $\eta$, (discussed above) help provide a smoothed approximation to the classification error count function. The gradient of the loss function (10) is used by the HMM update processor 88 to update the HMM parameters, $\Lambda_I$. Therefore, minimization of the expected loss of this specially designed loss function is directly linked to the minimization of the error probability.

C. Loss Function Sum

The loss function sum processor 86 provides a sum, L, of all values of $l_i$ determined to the present time for a given pass (or round) through the speech samples of database 70 (i.e., for all $l_i$ based on all X in the database 70 used to update $\Lambda$ so far):

$$L(\Lambda) = \sum_i l_i(X, \Lambda) \quad (11)$$

Values for both $l_i$ and L are provided by processor 86 to the HMM update processor 88. Value L based on a complete round through the database 70 is used by HMM update processor 88 as described below as part of a threshold determination.

D. HMM Update Processor

Prior to presenting a discussion of HMM parameter updating, some background to the operation of the HMM update processor 88 will be presented.

As mentioned above, the goal of parameter optimization in speech recognition is to minimize the expected error rate. If error rate is viewed as one form of loss, the general problem of minimizing expected loss can be written as follows:

$$J(\Lambda) = L(l(x, \Lambda)) \quad (12)$$

$$= E \left[ \sum_{k=1}^{W} P(W_k) l_k(x^{(i)}, \lambda_k) P(x^{(i)} | W_k) 1(x^{(i)} \in W_k) \right], \quad (13)$$

where W is the number of different words and $W_k$ is a word to be recognized. HMM model parameters $\Lambda$ may be adjusted recursively:

$$\Lambda_{n+1} = \Lambda_n - \epsilon_n U_n \nabla l(X_n, \Lambda_n), \quad (14)$$

where $U_n$ is a positive definite matrix (see (18) and associated text, below), $\epsilon_n$ is a sequence of positive numbers and $\nabla l(X_n, \Lambda_n)$ is the gradient vector of the loss function $l(X, \Lambda)$ (see (8) and (10)) at the n-th training sample $X_n$ with the parameter $\Lambda_n$. The recursion represented by (14) will converge to a stationary point of the expected loss, provided that $$\sum_{n=1}^{\infty} \epsilon_n = \infty \text{ and } \sum_{n=1}^{\infty} \epsilon_n^2 < \infty.$$

When the stationary point of the expected loss is not dense and the step size is sufficiently small, the stationary point to which convergence occurs will be a local minimum point of the expected loss. The sequence $\epsilon_n$ may be chosen illustratively to be (1.0–0.2R), where R is an integer equalling the number of the current training round beginning with R=0, and a round represents training based on all samples of training speech in database 70. In the illustrative embodiment, the maximum number of training rounds is fifty.

The illustrative embodiment of the present invention makes no assumptions regarding the probability distributions related to the expected loss. Therefore, error introduced by inaccurate distribution estimates is eliminated. Moreover, the embodiment adaptively adjusts the parameters according to the value of some observable features, such as log-likelihood score. Adaptation based on the function of the log-likelihood score is advantageous for the HMM-based recognizer using Viterbi scoring, because the exact segmentation and the log-likelihood score of the input utterance on the optimal path can be calculated precisely. This property is especially useful to HMMs and speech signal processing, because speech signals have a wide range of variations, including difference in articulation, frictive sound, and even noise introduced from the recording media.

In the illustrative embodiment of FIG. 2, the HMM parameters are adaptively adjusted according to (14) by HMM update processor 88. Due to the structure of HMMs, their parameters must satisfy certain constraints. HMM update processor 88 employs transformed HMM parameters as part of the parameter update process to satisfy all such constraints. The following transformations are used by processor 88:

(1) Logarithm of the variance $$\overline{\sigma}_{i,j,k,d}^2 = \log \sigma_{i,j,k,d}^2 \tag{15}$$

where $\sigma_{i,j,k,d}^2$ is the variance of the i-th word, j-th state, k-th mixture component and d-th dimension of a feature vector.

(2) Transformed logarithm of the mixture weights

The original mixture weights, $c_{i,j,k}$, are related to the transformed mixture weights $\overline{c}_{i,j,k}$ as follows:

$$c_{i,j,k} = \left[ \frac{e^{\overline{c}_{i,j,k}}}{\sum_{l=1}^{L} e^{\overline{c}_{i,j,l}}} \right] \tag{16}$$

where L is the total number of the mixture weights in the j-th state in the i-th word model.

(3) Transformed logarithm of the transition probability

The original transition probabilities, $a_{i,j}$, are related to the transformed transition probabilities as follows:

$$a_{i,j} = \frac{e^{\overline{a}_{i,j}}}{\sum_{k=1}^{M} e^{\overline{a}_{i,k}}} \tag{17}$$

where M is total number of states in i-th word model.

A significant aspect of the illustrative embodiment concerns the handling of small variance. In some corrective training algorithms proposed in the past, variance adjustment is avoided, because if handled incorrectly, it can have an adverse effect.

Variances in HMMs can differ by as much as $10^4$ to $10^6$ times. These variances occur in the exponent part of the observation probability density function $b_j^i(x)$ and have a dominant effect on the likelihood score of HMMs. In the illustrative embodiment, this leads to a different sensitivity to HMM parameter adjustments, especially to the adjustment of mean parameters in the observation probability density function of HMMs.

In order to compensate for this vast difference in sensitivity, the embodiment employs a positive definite matrix $U_n$. The positive definite matrix $U_n$ is a diagonal matrix:

$$\text{diag}(\sigma_1^2(n), \ldots, \sigma_D^2(n)), \tag{18}$$

for each state, where $\sigma^2(n)$ is the variance of HMM $\sigma_l$ at time n.

Regarding the update expressions themselves, each includes a term $\nabla l$ as described in (14) above. In general, $\nabla l$ takes the form $$\frac{\partial l}{\partial b} \times \frac{\partial b}{\partial \Lambda}.$$

The term $$\frac{\partial l}{\partial b} = l_i(1 - l_i)$$

is common among the updates and is presented as a partial derivative. The term $$\frac{\partial b}{\partial \Lambda}$$

is presented specifically for each model parameter being updated.

Figure 3:
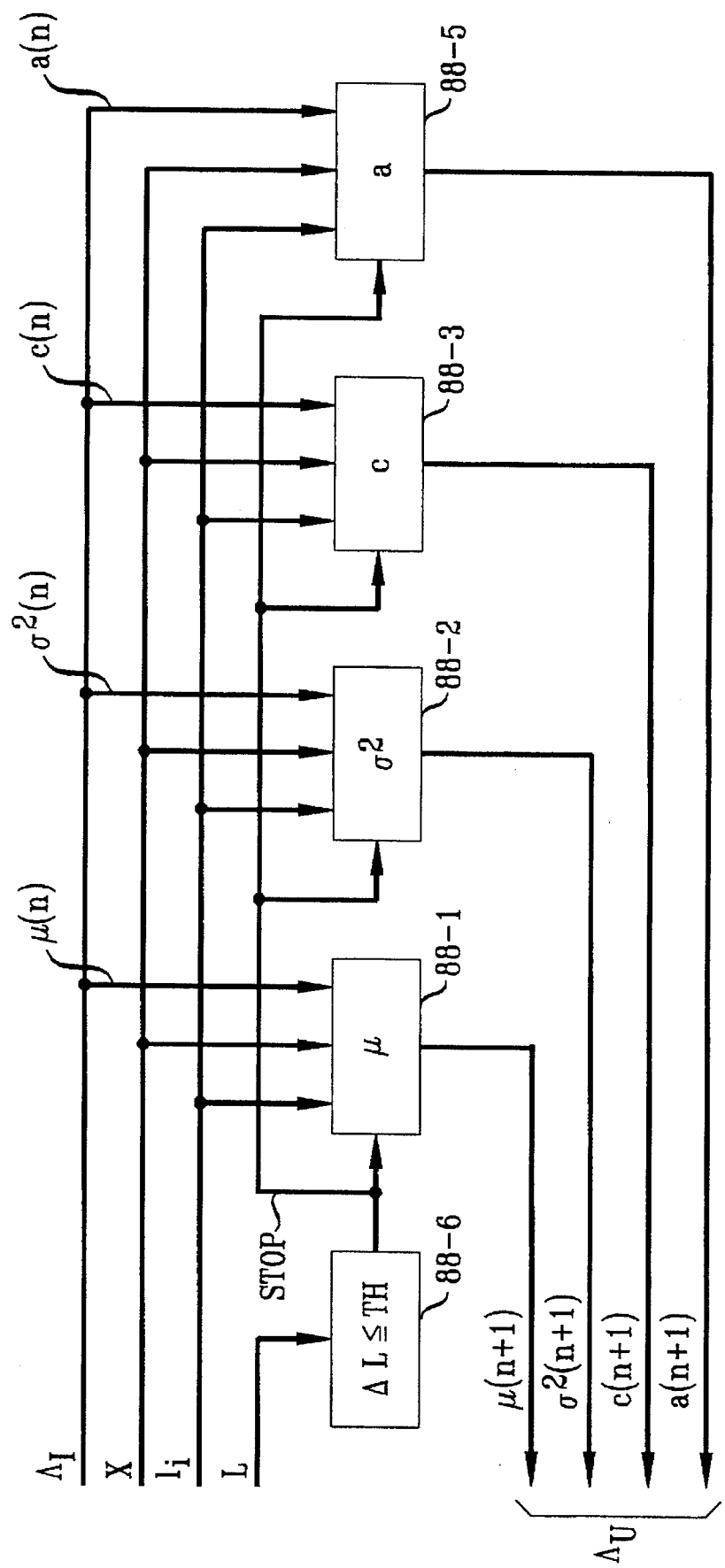
FIG. 3 presents an illustrative HMM update processor of FIG. 2.

FIG. 3 presents an illustrative block diagram of the HMM update processor 88. As shown in the Figure, the HMM update processor 88 updates parameters $\mu$, $\sigma^2$, c, and a, based on $\Lambda_I$, X and $l_i$, and returns an updated $\Lambda_U$ to HMM parameter data base 70. Both $\Lambda_I$ and $\Lambda_U$ comprise parameters $\mu$, $\sigma^2$, c and a, with $\Lambda_I$ and $\Lambda_U$ representing unupdated and updated quantities respectively.

The parameter updates provided by the HMM update processor 88 are:

(1) Mean update $$\mu_{i,j,k,d}(n+1) = \tag{19}$$

$$\mu_{i,j,k,d}(n) - \epsilon_n \sum_{nn=\theta_j}^{\theta_{j+1}-1} \left( \frac{\partial l(X, \Lambda)}{\partial \log b_{i,j}(x_{nn})} \right) \gamma_{i,j,k}(x_{nn})(x_{nn}(d) - \mu_{i,j,k,d}(n)),$$

where $x_{nn}(d)$ is the d-th dimension component of the feature vector $x_{nn}$, $\theta_j$ corresponds to the time frame that the optimal path first enters the state j, $\theta_{j+1}$ corresponds to the time frame that the optimal path enters the state j+1, $l(X, \Lambda)$ is the loss function constructed according to (10), $\epsilon_n$ is the step size and $$\gamma_{i,j,k}(x_{nn}) = \tag{20}$$

$$\left( c_{i,j,k} (2\pi)^{-D/2} \left( \prod_{d=1}^{D} \sigma_{i,j,k,d} \right)^{-1} \prod_{d=1}^{d} e^{-\frac{(x_m(d) - \mu_{i,j,k,d})^2}{2\sigma_{i,j,k,d}^2}} \right) / b_{i,j}(x_{nn}),$$

where D is the dimension of the feature vector. The mean update is provided by block 88-1 of FIG. 3.

(2) Variance update

Updating of $\overline{\sigma}^2 = \log \sigma^2$ is performed according to the following formula:

$$\overline{\sigma}^2_{i,j,k,d}(n+1) = \overline{\sigma}^2_{i,j,k,d}(n) - \qquad (21)$$

$$\epsilon_n \sum_{nn=\theta_j}^{\theta_{j+1}-1} \left( \frac{\partial l(X,\Lambda)}{\partial \log b_{i,j}(x_{nn})} \right) \gamma_{i,j,k}(x_{nn}) \left( \frac{(x_{nn}(d) - \mu_{i,j,k,d})^2}{2\sigma^2_{i,j,k,d}(n)} - 0.5 \right),$$

where $\gamma_{i,j,k}(x_{nn})$ is defined as in (20). Therefore, the variance at time n+1 is given by $$\sigma_{i,j,k,d}^2(n+1) = e^{\overline{\sigma}_{i,j,k,d}^2}(n+1). \qquad (22)$$

Variance is clipped below at $10^{-6}$ and it satisfies the constraint of $\sigma_{i,j,k,d}^2(n) > 10^{-6}$. The variance update is provided by block 88-2 of FIG. 3.

(3) Mixture weights update

The parametrized mixture weights are adjusted according to $$\overline{c}_{i,j,k}(n+1) = \overline{c}_{i,j,k}(n) - \qquad (23)$$

$$\epsilon_n \sum_{nn=\theta_j}^{\theta_{j+1}-1} \left( \frac{\partial l(X,\Lambda)}{\partial \log b_{i,j}(x_{nn})} \right) \frac{c_{i,j,k}(n)}{b_{i,j}(x_{nn})} [N(x_{nn}, \mu_{i,j,k,d}, V_{i,j,k,d}) - b_{i,j}(x_{nn})].$$

Therefore, the mixture weights at time n+1 is given by $$c_{i,j,k}(n+1) = \frac{e^{\overline{c}_{i,j,k}(n+1)}}{\sum_{l=1}^{L} e^{\overline{c}_{i,j,l}(n+1)}}. \qquad (24)$$

Thus, the adjusted mixture weights meet the constraints of $$\sum_k c_{i,j,k}(n) = 1 \text{ and } c_{i,j,k}(n) > 0$$

during training process. The mixture weights update is provided by block 88-3 of FIG. 3.

(4) State transition probability update:

In a left-to-right HMM, the parametrized transition probability of the l-th word model is adjusted by:

$$\begin{cases} \overline{a}^l_{i,i}(n+1) = \overline{a}^l_{i,i}(n) - \epsilon_n \frac{\partial l(X,\Lambda)}{\partial g_l} \left( N^l_{i,i} - (N^l_{i,i}+1) \frac{e^{\overline{a}^l_{i,i}(n)}}{e^{\overline{a}^l_{i,i}(n)} + e^{\overline{a}^l_{i,i+1}(n)}} \right) \\ \overline{a}^l_{i,i+1}(n+1) = \overline{a}^l_{i,i+1}(n) - \epsilon_n \frac{\partial l(X,\Lambda)}{\partial g_l} \left( 1 - (1+N^l_{i,i}) \frac{e^{\overline{a}^l_{i,i+1}(n)}}{e^{\overline{a}^l_{i,i}(n)} + e^{\overline{a}^l_{i,i+1}(n)}} \right) \end{cases} \qquad (25)$$

where $g_l$ is the likelihood score of X in the l-th word model, i is not the end state and the total number of self-transition inside state i is denoted by $$N^l_{i,i} = \{\# \text{ of}\} t | (\theta_{t-1}, \theta_t) = (i,i) \text{ in } i\text{-th word model } \lambda_1\} \qquad (26)$$

Consequently, the transition probability at time (n+1) is given by $$\begin{cases} a^l_{i,i}(n+1) = \frac{e^{\overline{a}^l_{i,i}(n+1)}}{e^{\overline{a}^l_{i,i}(n+1)} + e^{\overline{a}^l_{i,i+1}(n+1)}} \\ a^l_{i,i+1}(n+1) = \frac{e^{\overline{a}^l_{i,i+1}(n+1)}}{e^{\overline{a}^l_{i,i+1}(n+1)} + e^{\overline{a}^l_{i,i+1}(n+1)}} \end{cases} \qquad (27)$$

which also satisfies the constraints of $$\sum_j a^l_{i,j}(n) = 1, a^l_{i,i} > 0 \text{ and } a^l_{i,i+1} > 0.$$

The state transition probability update is provided by block 88-5 of FIG. 3.

Update expressions (21–24) computed by HMM update processor 88 relate to an updated observation probability density function of the i-th word, in the j-th state according to:

$$b_{i,j}(x) = \sum_{k=1}^{M} c_{i,j,k} N(x, \mu_{i,j,k}, V_{i,j,k}) \qquad (28)$$

where $C_{i,j,k}$ is the mixture weights and $N(x, \mu_{i,j,k}, V_{i,j,k})$ is a D-dimensional normal Gaussian distribution for the i-th word, j-th state and k-th mixture with a diagonal covariance matrix $V_{i,j,k}$. Values for $\mu(n+1)$, $\sigma^2(n+1)$, and $c(n+1)$ output from blocks 88-1 through 88-3 are returned to database 70, along with values for state transition probabilities $a(n+1)$ provided by block 88-5. As shown in FIG. 3, $\Lambda_U$ comprises updated values for $\mu$, $\sigma^2$, c and a.

Expression for HMM parameter updating provided above concern the use of a single speech training sample from database 70 to enchance HMM parameters. Enhanced trainer 80 may iterate a plurality of times, however, to improve the HMM parameters. For example, the enhanced trainer 80 may operate on all training samples in database 70. However, if desired, trainer 80 may operate on several passes or rounds through the complete database 70. Trainer 80 may be made to stop processing samples in any of several ways. For example, the trainer 80 may stop when it has made a fixed number of rounds through the database 70 of samples. It is preferred, however, that trainer 80 maintain a record of the incremental improvement in loss due to processing all speech training samples of the current round. The illustrative embodiment of the present invention tests for incremental improvement in loss by forming a difference, $\Delta L$, between values of L as determined by processor 86 in the current and previous rounds. When $\Delta L$ is less than or equal to a preset threshold (illustratively, 0.005), processing by the enhanced trainer 80 may cease (see FIG. 3, 88-6 and STOP signal).

E. Discussion

As can be seen from FIG. 1, only a minimal amount of alteration to a conventional HMM-based recognizer is required to implement the first illustrative embodiment of the present invention.

While FIG. 1 specifically concerns an HMM recognizer, the present invention is applicable to other recognizers as well, such as, e.g., a template-based recognizer employing dynamic time warping as the method of scoring. In order to adapt the present invention to other types of recognizers, the method of scoring, represented as function g in (8), must be changed to reflect the recognizer type. This change would also be reflected in the HMM update process in terms of $\nabla l$.

In addition to applicability to training for speech recognition systems, the present invention has applicability to speaker recognition, such as speaker verification or speaker identification.

In the embodiment described above, each sample of training speech is used sequentially. The HMM update processor 88 takes the information provided by the recognizer on the current sample and updates HMM parameters according to the updating formulae provided above. The computational complexity of processor 88 depends mainly on the form of the misrecognition measure which determines how many competing candidate models will be adjusted for each input utterance. In the illustrative embodiment, all competing word HMMs can be adjusted. The advantage of this approach is to make an efficient use of the available training speech. In conventional training methods, each word HMM model is trained by the utterances of that particular word only. The inter-relation between the correct model and the other competing models is not explored. This can be a major factor that impairs the performance of the recognizer, especially when trying to discriminate between words from confusing classes.

In some applications, usually there are only a few competing candidates with a score which is close to the correct one. The misrecognition measure (8) can be constructed to include only a selected number of competing candidates. Step size $\epsilon_n$ generally depends on the given HMMs and the parameters of the loss function. However, the expected loss and the error rate on the training samples are often good indicators of the proper step size.

As described above, each iteration of the enhanced trainer 80 operates on a single speech training sample (i.e., N=1). However, it is possible for the trainer to provide an updated set of HMM parameters, $\Lambda_U$, based on a plurality of samples. To do this, the misrecognition measure processor 82 operates on a vector of speech samples to yield a vector of values for d, where each value corresponds to a given sample. Word loss function processor 84 receives the vector of d values and yields a vector of l values, each based on a corresponding value of d. Loss function sum 86 operates to determine L as $$\frac{1}{N} \sum_{n=1}^{N} l_n,$$

for purposes of the above described threshold calculation, where N is the number of samples of speech currently being processed and $l_n$ represents the elements of the vector of l values provided by processor 84. HMM update processor 88 updates parameters as described above, where each update $\lambda(n)$ to $\lambda(n+1)$ is provided by a single speech sample (of the N samples). However, all N samples are used in succession such that $\lambda(n+1)$ resulting from processing one sample serves as $\lambda(n)$ for processing a subsequent sample. Note that in updating $\Lambda_I$ based on N samples, the value of $\Lambda_I$ on the right side of (19, 21, 23 and 25) remains constant. Only after all N samples have been processed is $\Lambda_I$ updated to the database as $\Lambda_U$.

Note that the loss function presented in (10) is but one type of function applicable to the present invention. Other types of functions, such as that based on the hyperbolic tangent, are also applicable, i.e., $l_i(d_i(X,\Lambda)) = \tanh(\gamma d_i(X,\Lambda))$.

The iterative process described generally by (14), and specifically by (19, 21, 23, and 25), provided for the identification of a local minimum of the loss function. However, conventional techniques for finding the global minimum of the loss function, such as simulated annealing, may be applied.

It should be understood that the parameter update process described by (14) can be made to operate on unknown data in an on-line, bootstrap, adaptive manner. Suppose at time n, the recognizer parameter $\Lambda_n$ is used to identify an unknown utterance $X_n$ and the decision based on $\Lambda_n$ is to identify $X_n$ as word $W_k$. The decision is then fed back to the enhanced trainer 80 as a training sample so that the update process (14) can produce a new recognizer parameter $\Lambda_{n+1}$ for later use.

The difference between the normal (known data) and the bootstrap (unknown data) mode is in the way the word label is provided. In the normal case, word labels are known a priori in conventional fashion. In the bootstrap case, the word label is produced by the recognizer itself.

In light of the above, it will be apparent to one of ordinary skill in the art that the present invention is applicable to both speaker-dependent and speaker-independent speech recognition.

Moreover, it should be understood that the advantages provided by the present invention may be extended to the training of models for phrases or strings of one or more words. An embodiment for multiple word (or string) training may be provided by defining a string model of, e.g., HMMs for a string, rather than for each word, and training on sample phrases. An embodiment for string level training is presented below.

III. A Second Illustrative Embodiment

Figure 4:
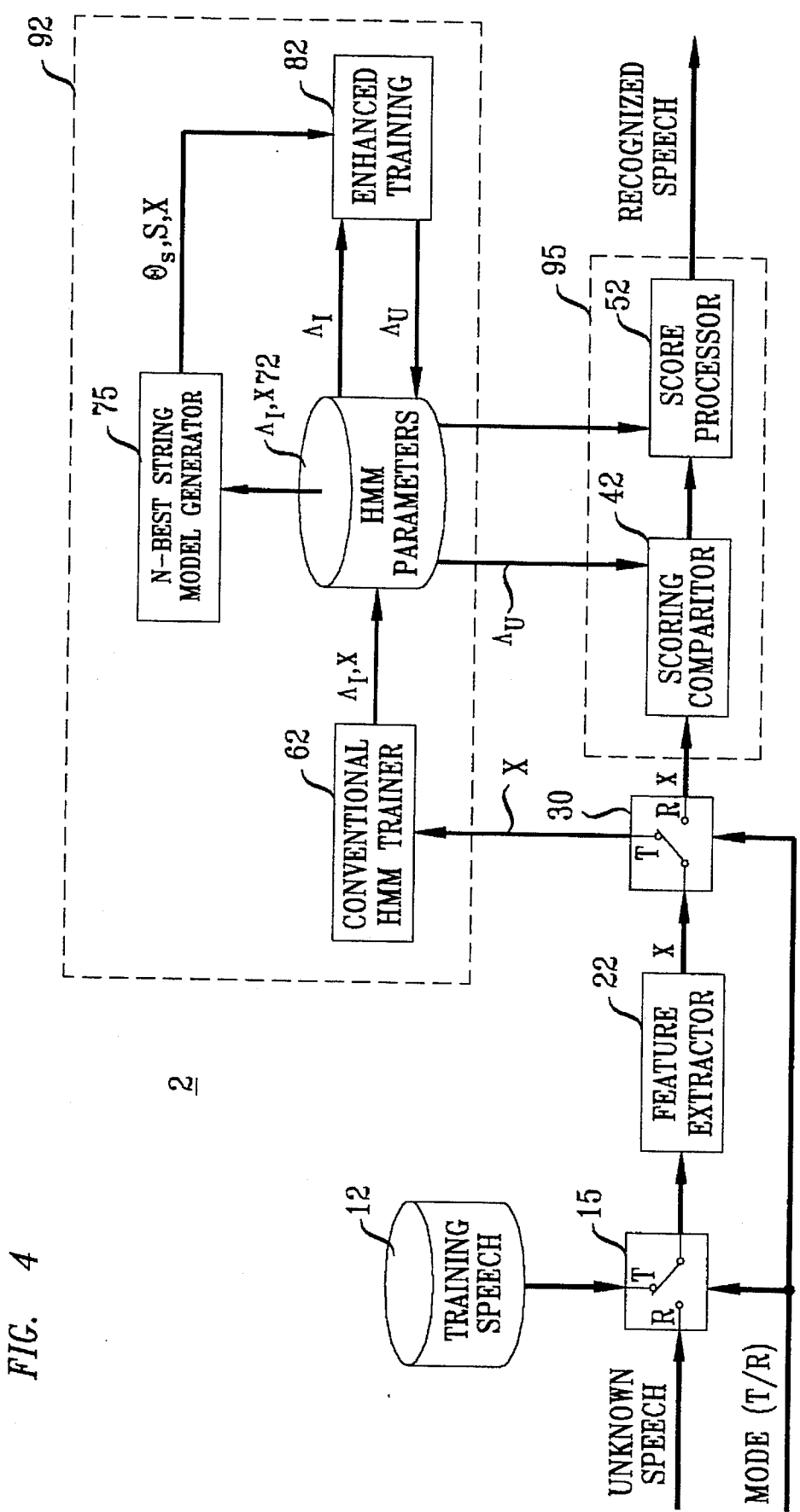
FIG. 4 presents an illustrative HMM-based speech recognition system according to a second embodiment of the present invention.

FIG. 4 presents an illustrative embodiment of the present invention in the context of an HMM speech recognition system 2. The system 2 includes a training speech database 12, a feature extractor 22, mode switches 15,30, a scoring comparator 42, score processor 52, conventional trainer 62, HMM parameter (pattern) database 72, N-best string model generator 75, and an enhanced trainer 82.

The training speech database 12 of system 2 comprises samples of known speech signals in digital form. Each speech signal corresponds to a string of one or more spoken words. These samples are used for the purposes of the conventional and enhanced trainers 62, 82, respectively. Samples of known speech strings from database 12 are provided to other components of the system 2 via mode switch 15. Mode switch 15 operates in a similar fashion to the mode switch of FIG. 1.

The feature extractor 22 of system 1 is coupled to mode switch 15. Depending on the state of mode switch 15, extractor 22 will receive either training or unknown speech signal strings. Based on these received speech signals, extractor 22 produces one or more feature vectors, X, characterizing the received speech string. Feature extractor 20 may be any of the conventional types.

Feature vectors output from extractor 22 are provided to a second mode switch 30. This mode switch 30 operates in tandem with mode switch 15 as discussed above.

The recognition section 95 of system 1 comprises a scoring comparator 42 and a score processor 52. The scoring comparator 42 relates a string of one or more recognition unit models (in this case, HMMs) to an unknown speech signal string, and determines a score indicating the closeness of the comparison. Conventional HMM scoring comparators employing log-likelihood Viterbi scoring may be used for comparator 42 as discussed above. Scores produced by comparator 42 are provided to the score processor 52. Score processor 52 determines which of the provided scores is greatest and identifies the string of HMMs responsible for that score. The unknown speech signal string is recognized by processor 52 as the known speech associated with the identified string of HMMs. Processor 52 obtains representations of identified speech for output from HMM parameter database 72 (see below)

The training section 92 of system 2 comprises a conventional HMM trainer 62, an HMM parameter database 72, an N-best string model generator 75, and an enhanced trainer 82. HMM trainer 62, such as, e.g., that described by U.S. Pat. No. 4,783,804, provides conventional training of HMMs. The output of trainer 62 comprises a set of one or more conventionally trained HMMs, $\Lambda_I$, as well as the feature vectors, X, of training speech strings on which the set of HMMs are based. For purposes of the illustrative embodiment of the present invention, the degree of training provided by conventional trainer 62 is unimportant. Conventional trainer 62 may, for example, provide an initial set of HMM parameters, $\Lambda_I$ (even if trivial), which have been retrieved from read-only memory.

The output of trainer 62 is recorded in HMM database 72 for use by generator 75 and enhanced trainer 82 as initialization parameters. Enhanced trainer 82 receives $\Lambda_I$ and returns to database 72 a set of enhanced or updated Hmms, $\Lambda_U$. Ultimately, enhanced models, $\Lambda_U$, are provided to scoring comparator 42 during recognition mode. The scoring comparator's 42 use of enhanced HMMs, $\Lambda_U$, rather than conventionally trained HMMs, $\Lambda_I$, provides for a reduced string recognition error rate.

N-best string model generator 75 receives HMM $\Lambda_I$ and training speech strings X and generates a set of string models which are highly competitive with the lexical string model. These competitive string models provide a basis for discriminative training of enhanced trainer 82.

Generator 75 generates the N-best (or most competitive) string models by determining the N-best (competitive) word strings and, for each such word string, the best sequence of recognition unit HMMs. Determination of the N-best word strings is made through use of a DSP implementation of a modified Viterbi decoder of the type described by F. K. Soong and E. F. Huang, A tree-trellis based fast search for finding N-best sentence hypotheses in continuous speech recognition, Proc. ICASSP (1991), which is incorporated by reference as if fully set forth herein. This decoder prepares a partial path map, i.e., a list of all scores (or metrics) of all partial paths leading to any grammar node (i.e., word juncture) at every time instant. Then, at the end of the modified Viterbi forward search, the decoder employs an A* traceback tree-search procedure well known in the art. Generator 75 performs the tree-search by growing the top (best) partial path which is at the top of a "stack" (a rank ordered data list). The rank ordering of all partial paths on the stack is determined by the best possible score that a partial path can achieve when completed. The partial path map prepared in the forward Viterbi search provides a score for any incomplete partial path in the backward tree search. Due to the "best first" nature of the A* procedure, the top N-strings are generated sequentially.

The admissibility of the A* algorithm, or sure findings of the optimal path(s), is guaranteed when an upper bound of the incomplete portion of a partial path is used the stack decoder, given the stack depth is deep enough to avoid any search errors. In the tree-trellis procedure, the tightest upper bound or the actual score of the path is obtained if the same HMMs are used in the searches along both directions. As a result, the search efficiency of the algorithm is maximized and a stack of N entries is needed.

Generator 75 generates N-best string models based on the N-best word strings by a Viterbi alignment of the input speech string, X, against the model sets for each given word string in the N-best string list. This step is performed by generator 75 because there may be many string models corresponding to the same word string; but the string model that best matches the input utterance for a given model set is unique.

It should be noted that generator 75 provides a capability of modeling unseen competitive strings. This is due to the fact that competing word strings generated through N-best decoding are not limited by the training material. The N-best string list is dynamic and reflects the string level acoustic resolution based on the given speech recognition unit model set. The basic recognition unit models are, therefore, trained by word strings generated by a recognizer, including word strings not present in the original training material but which the recognizer finds confusing with the lexical string. Unseen word strings which the recognizer finds confusing with the lexical word string are modeled discriminatively. Therefore, the modeling coverage for the unseen strings can be improved. Modeling unseen strings can be useful because such modeling reduces difficulties encountered in continuous speech recognition due to poor string coverage of the training material.

The operation of generator 75 described above may be summarized as follows. Let $S=W_1, \ldots, W_{l_s}$ be an arbitrary word string. Given the model set $\Lambda$, the optimal state sequence $\Theta_S$ is a function of the observation X and the word string S. The top N best string hypothesis $\{S_1, \ldots, S_N\}$ can be defined inductively as follows, $$S_1 = \underset{S}{\text{argmax}} \; \log f(X, \Theta_S, S|\Lambda), \tag{29}$$

$$S_k = \underset{S \neq S_1, \ldots, S_{k-1}}{\text{argmax}} \; \log f(X, \Theta_S, S|\Lambda). \tag{30}$$

In minimum string error rate training, these string level acoustic training tokens are incorporated into a set of discriminant functions specially designed for representing string errors. This is done by operation of the enhanced trainer 82, as described below.

Figure 5:
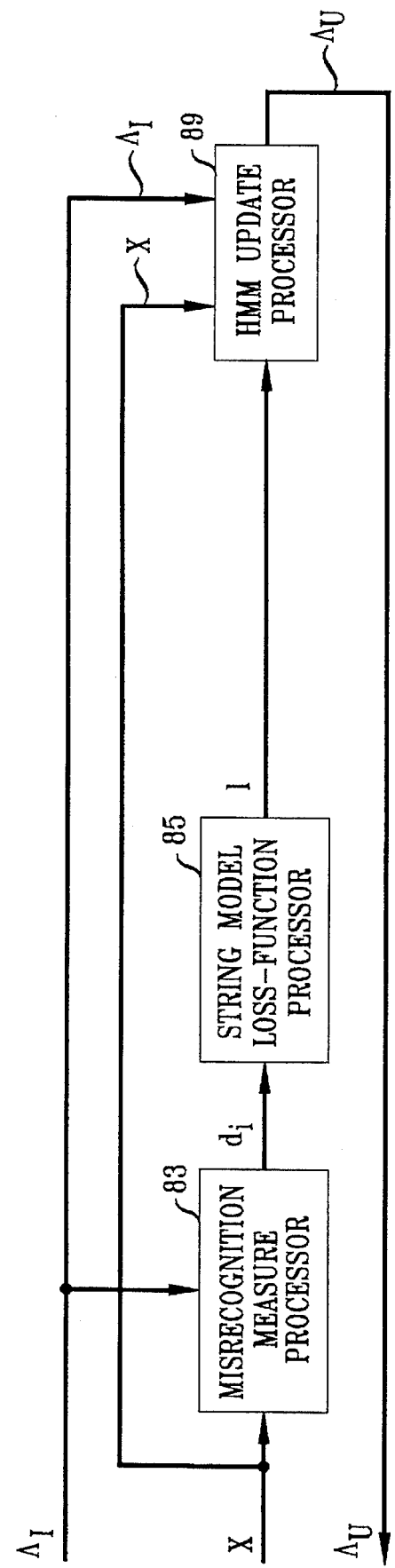
FIG. 5 presents an illustrative enhanced trainer of FIG. 4.

FIG. 5 presents an illustrative embodiment of the enhanced trainer 82 appearing in FIG. 4. Enhanced trainer 82 operates on training speech provided by recognition unit HMM parameter database 72. As a result of enhanced trainer 82 operation, an updated set of recognition unit HMMs, $\Lambda_U$, is returned to HMM parameter database 72. $\Lambda_U$ may then be used subsequently during recognition mode as a set of recognizer reference patterns, or as a new $\Lambda_I$ to be updated further as a result of processing the same or additional training speech.

For purposes of explanation clarity and computational simplicity, the HMM update processor is illustratively described as processing one training string at a time. With a slight modification to be described below (see Discussion section), the embodiment can update $\Lambda_I$ based on several training speech string samples.

Referring to FIG. 5, enhanced trainer 82 comprises a string misrecognition measure processor 83, a string model loss function processor 85, and an HMM update processor 89.

A. String Misrecognition Measure Processor

String misrecognition measure processor 83 receives HMM parameters, $\Lambda_I$, optimal state sequences, $\Theta_{S_k}$, and N string models, $S_k$, and a training speech string sample, X, from generator 75. Based on string sample, X, models $S_k$, and $\Lambda_I$, processor 83 determines a string misrecognition measure, $d_i(X,\Lambda)$:

$$d(X, \Lambda) = -g(X, S_{lex}, \Lambda) + \log \left[ \frac{1}{N-1} \sum_{S_k \neq S_{lex}} e^{g(X, S_k, \Lambda)\eta} \right]^{\frac{1}{\eta}} \tag{31}$$

where $g(X, S_{lex},\Lambda)=\log f(X,\Theta_{S_k},S_{lex}|\Lambda)$ is a log-likelihood recognizer score of the input utterance X given $S_{lex}$ as the correct string and $\Theta_{S_k}$ as the optimal alignment path; $\eta$ is a positive number illustratively set to 2; and N is the total number of competing strings provided by generator 75. String misrecognition measure processor 83 determines the value of a scalar, d, for use by the subsequent processors shown in FIG. 5.

B. String Model Loss Function Processor

String model loss function processor 85 evaluates a smooth string loss function, l, based on the scalar value $d(X,\Lambda)$ received from processor 83:

$$l(X, \Lambda) = \frac{1}{1 + e^{-\gamma d(X,\Lambda)}}, \tag{32}$$

where $\gamma$ is illustratively set to 1

Processor 85 provides scalar l as output to HMM update processor 89.

Parameters $\gamma$ and $\eta$, (discussed above) help provide a smoothed approximation to the string loss function, l. The gradient of the string loss function is used by the HMM update processor 89 to update the recognition unit HMM parameters, $\Lambda_I$, based on the global string level acoustic model matching. Therefore, minimization of the expected string loss of this loss function is directly linked to the minimization of the string error probability.

C. HMM Update Processor

Prior to presenting a discussion of recognition unit HMM parameter updating, some background to the operation of the HMM update processor 89 will be presented.

The expected loss which is associated with the string error rate is given by $$L(\Lambda) = E_X[l(X,\Lambda)] \tag{33}$$

In minimum string error rate training, the goal is to minimize the expected loss (33) over the training samples. The expected loss (33) may be minimized by updated recognition unit model parameters such that $$\Lambda_{n+1} = \Lambda_n - \epsilon_n U_n \nabla l(X,\Lambda), \tag{34}$$

where $\epsilon_n$ is a sequence of step size parameters and $U_n$ is a sequence of positive definite matrices defined below. The recursion represented by (34) will converge to a stationary point of the expected loss, provided that $$\sum_{n=1}^{\infty} \epsilon_n = \infty \text{ and } \sum_{n=1}^{\infty} \epsilon_n^2 < \infty.$$

In the illustrative embodiment of FIG. 5, the HMM parameters are adaptively adjusted according to (34) by HMM update processor 89. Due to the structure of HMMs, their parameters must satisfy certain constraints. HMM update processor 89 employs transformed HMM parameters as part of the parameter update process to satisfy all such constraints. The following transformations are used by processor 89:

(1) Logarithm of the variance $$\bar{\sigma}_{i,j,k,d}^2 = \log \sigma_{i,j,k,d}^2 \tag{35}$$

where $\sigma_{i,j,k,d}^2$ is the variance of the i-th recognition unit model, j-th state, k-th mixture component and d-th dimension of a feature vector, where each recognition unit model may reflect, e.g., a word or subword.

(2) Transformed logarithm of the mixture weights

The original mixture weights, $c_{i,j,k}$, are related to the transformed mixture weights $\bar{c}_{i,j,k}$ as follows:

$$c_{i,j,k} = \left[ \frac{e^{\bar{c}_{i,j,k}}}{\sum_{l=1}^{L} e^{\bar{c}_{i,j,l}}} \right] \tag{36}$$

where L is the total number of the mixture weights in the j-th state in the i-th recognition unit model.

(3) Transformed logarithm of the transition probability

The original transition probabilities, $a_{i,j}$, are related to the transformed transition probabilities as follows:

$$a_{i,j} = \frac{e^{\bar{a}_{i,j}}}{\sum_{k=1}^{M} e^{\bar{a}_{i,k}}} \tag{37}$$

where M is total number of states in i-th recognition unit model.

A significant aspect of the illustrative embodiment concerns the handling of small variance. In some corrective training algorithms proposed in the past, variance adjustment is avoided, because if handled incorrectly, it can have an adverse effect.

Variances in HMMs can differ by as much as $10^4$ to $10^6$ times. These variances occur in the exponent part of the observation probability density function $b_i^j(x)$ and have a dominant effect on the likelihood score of HMMs. In the illustrative embodiment, this leads to a different sensitivity to HMM parameter adjustments, especially to the adjustment of mean parameters in the observation probability density function of HMMs.

In order to compensate for this vast difference in sensitivity, the embodiment employs a positive definite matrix $U_n$. The positive definite matrix $U_n$ is a diagonal matrix:

$$\text{diag}(\sigma_1^2(n), \ldots, \sigma_D^2(n)), \tag{38}$$

for each state, where $\sigma^2(n)$ is the variance of HMM $\Lambda_I$ at time n.

Regarding the update expressions themselves, each includes a term $\nabla l$ as described in (11) above. In general, $\nabla l$ takes the form $$\frac{\partial l}{\partial b} \times \frac{\partial b}{\partial \Lambda}.$$

The term $$\frac{\partial l}{\partial b} = l_i(1 - l_i)$$

is common among the updates and is presented as a partial derivative. The term $$\frac{\partial b}{\partial \Lambda}$$

is presented specifically for each model parameter being updated.

Figure 6:
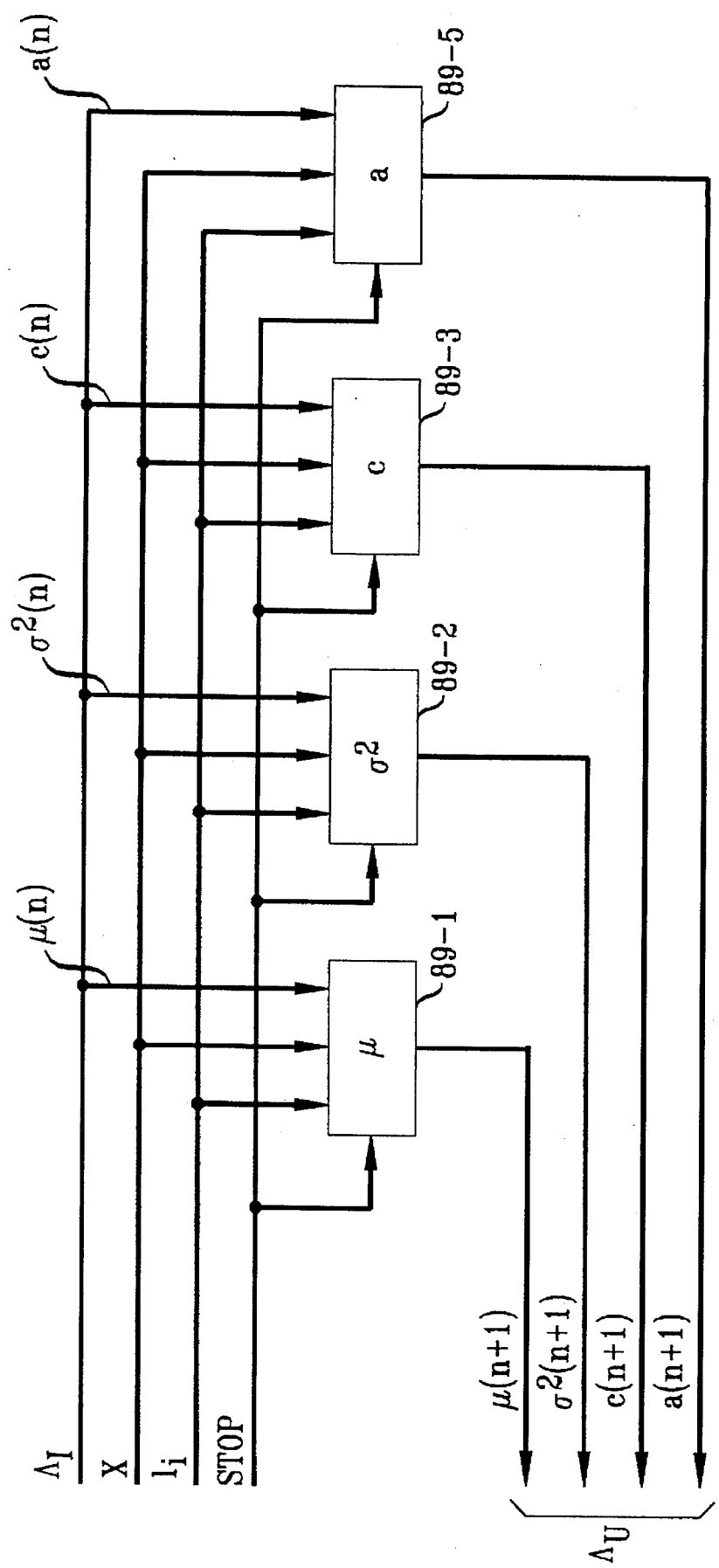
FIG. 6 present an illustrative HMM update processor of FIG. 5.

FIG. 6 presents an illustrative block diagram of the HMM update processor 89. As shown in the Figure, the HMM update processor 89 updates parameters $\mu$, $\sigma^2$, c, and a, based on $\Lambda_I$, X and l, and returns an updated $\Lambda_U$ to HMM parameter data base 72. Both $\Lambda_I$ and $\Lambda_U$ comprise parameters $\mu$, $\sigma^2$, c and a, with $\Lambda_I$ and $\Lambda_U$ representing unupdated and updated quantities respectively.

The parameter updates provided by the HMM update processor 89 are:

(1) Mean update $$\mu_{i,j,k,d}(n+1) = \mu_{i,j,k,d}(n) - \tag{39}$$

$$\epsilon_n \sum_{nn=\theta_j}^{\theta_{j+1}-1} \left( \frac{\partial l(X, \Lambda)}{\partial \log b_{i,j}(x_{nn})} \right) \gamma_{i,j,k}(x_{nn})(x_{nn}(d) - \mu_{i,j,k,d}(n)),$$

where $x_{nn}(d)$ is the d-th dimension component of the feature vector $x_{nn}$, $\theta_j$ corresponds to the time frame that the optimal path first enters the state j, $\theta_{j+1}$ corresponds to the time frame that the optimal path enters the state j+1, l(X,Λ) is the loss function constructed according to (32), $\epsilon_n$ is the step size and $$\gamma_{i,j,k}(x_{nn}) = \left( c_{i,j,k}(2\pi)^{-D/2} \left( \prod_{d=1}^{D} \sigma_{i,j,k,d} \right) \prod_{d=1}^{D} e^{-\frac{(x_{nn}(d)-\mu_{i,j,k,d})^2}{2\sigma_{i,j,k,d}^2}} \right)^{-1} /b_{i,j}(x_{nn}), \quad (40)$$

where D is the dimension of the feature vector. The mean update is provided by block 89-1 of FIG. 6.

(2) Variance update

Updating of $\overline{\sigma}^2 = \log \sigma^2$ is performed according to the following formula:

$$\overline{\sigma}_{i,j,k,d}^2(n+1) = \overline{\sigma}_{i,j,k,d}^2(n) - \quad (41)$$

$$\epsilon_n \sum_{nn=\theta_j}^{\theta_{j+1}-1} \left( \frac{\partial l(X,\Lambda)}{\partial \log b_{i,j}(x_{nn})} \right) \gamma_{i,j,k}(x_{nn}) \left( \frac{(x_{nn}(d)-\mu_{i,j,k,d})^2}{2\sigma_{i,j,k,d}^2(n)} - 0.5 \right),$$

where $\gamma_{i,j,k}(x_{nn})$ is defined as in (40). Therefore, the variance at time n+1 is given by $$\sigma_{i,j,k,d}^2(n+1) = e^{\overline{\sigma}_{i,j,k,d}^2(n+1)}. \quad (42)$$

Variance is clipped below at $10^{-6}$ and it satisfies the constraint of $\sigma_{i,j,k,d}^2(n) > 10^{-6}$. The variance update is provided by block 89-2 of FIG. 6.

(3) Mixture weights update

The parametrized mixture weights are adjusted according to $$\tilde{c}_{i,j,k}(n+1) = \tilde{c}_{i,j,k}(n) - \quad (43)$$

$$\epsilon_n \sum_{nn=\theta_j}^{\theta_{j+1}-1} \left( \frac{\partial l(X,\Lambda)}{\partial \log b_{i,j}(x_{nn})} \right) \frac{c_{i,j,k}(n)}{b_{i,j}(x_{nn})} [N(x_{nn}, \mu_{i,j,k,d}, V_{i,j,k,d}) - b_{i,j}(x_{nn})].$$

Therefore, the mixture weights at time n+1 is given by $$c_{i,j,k}(n+1) = \frac{e^{\tilde{c}_{i,j,k}(n+1)}}{\sum_{l=1}^{L} e^{\tilde{c}_{i,j,l}(n+1)}}. \quad (44)$$

Thus, the adjusted mixture weights meet the constraints of $$\sum_k c_{i,j,k}(n) = 1 \text{ and } c_{i,j,k}(n) > 0$$

during training process. The mixture weights update is provided by block 89-3 of FIG. 6.

(4) State transition probability update:

In a left-to-right HMM, the parametrized transition probability of the l-th word model is adjusted by:

$$\begin{cases} \overline{a}_{i,i}^l(n+1) = \overline{a}_{i,i}^l(n) - \epsilon_n \frac{\partial l(X,\Lambda)}{\partial g_l} \left( N_{i,i}^l - (N_{i,i}^l + 1) \frac{e^{\overline{a}_{i,i}^l(n)}}{e^{\overline{a}_{i,i}^l(n)} + e^{\overline{a}_{i,i+1}^l(n)}} \right) \\ \overline{a}_{i,i+1}^l(n+1) = \overline{a}_{i,i+1}^l(n) - \epsilon_n \frac{\partial l(X,\Lambda)}{\partial g_l} \left( 1 - (1+N_{i,i}^l) \frac{e^{\overline{a}_{i,i+1}^l(n)}}{e^{\overline{a}_{i,i}^l(n)} + e^{\overline{a}_{i,i+1}^l(n)}} \right) \end{cases} \quad (45)$$

where $g_l$ is the likelihood score of X in the l-th recognition unit model, i is not the end state and the total number of self-transition inside state i is denoted by $$N_{i,i}^l = \{\#\text{of}\}t|(\theta_{t-1}, \theta_t) = (i,i) \text{ in l-th recognition unit model } \lambda_l\} \quad (46)$$

Consequently, the transition probability at time (n+1) is given by $$\begin{cases} a_{i,i}^l(n+1) = \frac{e^{\overline{a}_{i,i}^l(n+1)}}{e^{\overline{a}_{i,i}^l(n+1)} + e^{\overline{a}_{i,i+1}^l(n+1)}} \\ a_{i,i+1}^l(n+1) = \frac{e^{\overline{a}_{i,i+1}^l(n+1)}}{e^{\overline{a}_{i,i}^l(n+1)} + e^{\overline{a}_{i,i+1}^l(n+1)}} \end{cases} \quad (47)$$

which also satisfies the constraints of $$\sum_j a_{i,j}^l(n) = 1, a_{i,i}^l > 0 \text{ and } a_{i,i+1}^l > 0.$$

The state transition probability update is provided by block 89-5 of FIG. 6.

Update expressions (b 41–44) computed by HMM update processor 89 relate to an updated observation probability density function of the i-th recognition unit model, in the j-th state according to:

$$b_{i,j}(x) = \sum_{k=1}^{M} c_{i,j,k} N(x, \mu_{i,j,k}, V_{i,j,k}) \quad (48)$$

where $c_{i,j,k}$ is the mixture weights and $N(x, \mu_{i,j,k}, V_{i,j,k})$ is a D-dimensional normal Gaussian distribution for the i-th recognition unit model, j-th state and k-th mixture with a diagonal covariance matrix $V_{i,j,k}$. Values for $\mu(n+1)$, $\sigma^2(n+1)$, and $c(n+1)$ output from blocks 89-1 through 89-3 are returned to database 72, along with values for state transition probabilities a(n+1) provided by block 89-5. As shown in FIG. 6, $\Lambda_U$ comprises updated values for $\mu$, $\sigma^2$, c and a.

Expressions for HMM parameter updating provided above concern the use of a single speech training string sample from database 72 to enhance HMM parameters. Enhanced trainer 82 may iterate a plurality of times, however, to improve the HMM parameters. For example, the enhanced trainer 82 may operate on all training string samples in database 72. However, if desired, trainer 82 may operate on several passes or rounds through the complete database 72. Trainer 82 may be made to stop processing samples in any of several ways. For example, the trainer 82 may stop when it has made a fixed number of rounds through the database 72 of samples. Trainer 82 may also maintain a record of the incremental improvement in string error rate due to processing all speech training strings of the current round. When incremental improvement drops below a threshold, processing may stop.

D. Discussion

As can be seen from FIG. 4, only a minimal amount of alteration to a conventional HMM-based recognizer is required to implement an embodiment of the present invention.

While FIG. 4 specifically concerns an HMM recognizer, the present invention is applicable to other recognizers as well, such as, e.g., a template-based recognizer employing dynamic time warping as the method of scoring. In order to adapt the present invention to other types of recognizers, the method of scoring, represented as function g in (31), must be changed to reflect the recognizer type. This change would also be reflected in the recognition unit model update process in terms of $\nabla l$.

In addition to applicability to training for speech recognition systems, the present invention has applicability to speaker recognition systems, such as speaker verification or speaker identification.

In the embodiment described above, each sample string of training speech is used sequentially. The HMM update processor 89 takes the information provided by the recognizer on the current sample string and updates HMM parameters according to the updating formulae provided above. The computational complexity of processor 89 depends mainly on the form of the misrecognition measure which determines how many competing candidate string models will be used for recognition unit model parameter estimation.

As described above, each iteration of the enhanced trainer 82 operates on a single speech training sample. However, it is possible for the trainer to provide an updated set of HMM parameters, $\Lambda_U$, based on a plurality of samples. To do this, the string misrecognition measure processor 83 operates on a vector of speech string samples to yield a vector of values for d, where each value corresponds to a given string sample. String model loss function processor 85 receives the vector of d values and yields a vector of l values, each based on a corresponding value of d. HMM update processor 89 updates parameters as described above, where each update $\Lambda(n)$ to $\Lambda(n+1)$ is provided by a single speech string sample (of the N string samples). However, all string samples are used in succession such that $\Lambda(n+1)$ resulting from processing one sample serves as $\lambda(n)$ for processing a subsequent sample. Note that in updating $\Lambda_I$ based on multiple string samples, the value of $\Lambda_I$ on the right side of (39, 41, 43 and 45) remains constant. Only after all string samples have been processed is $\Lambda_I$ updated to the database as $\Lambda_U$.

Note that the loss function presented in (32) is but one type of function applicable to the present invention. Other types of functions, such as that based on the hyperbolic tangent, are also applicable, i.e., $l(d(X,\Lambda))=\tanh(\gamma d(X,\Lambda))$.

The iterative process described generally by (34), and specifically by (39,41,43, and 45), provides for the identification of a local minimum of the string loss function. However, conventional techniques for finding the global minimum of the loss function, such as simulated annealing, may be applied.

In light of the above, it will be apparent to one of ordinary skill in the art that the present invention is applicable to both speaker-dependent and speaker-independent speech recognition.

It will also be apparent that the present invention is advantageously employed in various speech communications systems, such as telephone networks. In such systems the training of recognition unit models may be performed as part of a customer enrollment process for voice command and control of network services (e.g., information services). As a general matter, an enrolement process will involve the recording and processing (whether or not in real time) of customer training utterances. The processing of these utterances produces recognition unit models according to the procedures described above. The resultant recognition unit models are stored in a database accessable to a network node (or nodes) providing services to customers under voice command. Such services may require, inter alia, speaker and speech recognition.

It will further be apparent that although discussed in the context of speech recognition, the techniques used to train models are applicable to pattern recognition generally.

We claim:

1. A method of making a speech recognizer recognition unit model database based on one or more known speech signals and a set of current recognizer recognition unit models, the method comprising the steps of:

receiving a known speech signal;

generating a first recognizer scoring signal based on the known speech signal and a current recognition unit model for that signal;

generating one or more other recognizer scoring signals, each such scoring signal based on the known speech signal and another current recognition unit model;

generating a misrecognition signal based on the first and other recognizer scoring signals;

based on a value of a predetermined loss function when applied to the misrecognition signal and the known speech signal, modifying one or more of the current recognition unit models to decrease the likelihood of misrecognizing an unknown speech signal; and storing one or more modified recognition unit models in memory.

2. The method of claim 1 wherein the step of generating a misrecognition signal comprises the step of forming a difference between:

a. the first recognizer scoring signal; and b. an average of the one or more other recognizer scoring signals.

3. The method of claim 1 wherein the first recognizer scoring signal reflects how well the known speech signal matches the current recognition unit models for that signal.

4. The method of claim 1 wherein the one or more other scoring signals reflect how well the known speech signal matches one or more other current recognition unit models.

5. The method of claim 1 wherein the step of modifying one or more of the current speech recognition unit models comprises the steps of:

a. determining a gradient of a function relating
      i. recognizer scoring of known speech based on a current recognition unit model for that speech to
      ii. recognizer scoring of known speech based on one or more other current recognition unit models; and b. adjusting one or more parameters of the current speech recognition unit models based on the gradient.

6. The method of claim 5 wherein the step of adjusting one or more parameters is further based on a matrix of current recognition unit model parameters.

7. The method of claim 6 wherein the matrix of current recognition unit model parameters comprises variances of the models.

8. The method of claim 5 wherein the step of adjusting one or more parameters comprises the step of adjusting transformations of recognition unit model parameters to adhere to recognition unit model constraints.

9. The method of claim 1 wherein the set of current recognition unit models comprises one or more hidden Markov models.

10. The method of claim 1 wherein the set of current recognition unit models comprises one or more templates.

11. The method of claim 1 wherein the current recognition unit models comprise the output of a recognition unit model trainer.

12. The method of claim 1 wherein the current recognition unit models comprise a modified set of recognition unit models.

13. The method of claim 1 wherein the step of modifying current recognition unit models comprises the step of modifying recognition unit models a plurality of times prior to storing modified recognition unit models in memory, each of the plurality of modifications based on a distinct known speech signal.

14. The method of claim 1 further comprising the steps of:

recognizing an unknown speech signal based on current recognition unit models;

providing the recognized speech signal to be received as a known speech signal.

15. A speech recognizer trainer for providing a speech recognizer database based on one or more known speech signals and a set of current recognition unit models, the trainer comprising:

means for generating a first recognizer scoring signal based on the known speech signal and a current recognition unit model for that signal;

means, coupled to the means for generating a first recognizer scoring signal, for generating one or more other recognizer scoring signals, each such scoring signals based on the known speech signal and another current recognition unit model;

means, coupled to the means for generating a first and other recognizer scoring signals, for generating a misrecognition signal based on the first and other recognizer scoring signals;

means, coupled to the means for generating a misrecognition signal, for modifying one or more of the recognition unit models, based on a value of a predetermined loss function when applied to the misrecognition signal and the known speech signal, to decrease the likelihood of misrecognizing an unknown speech signal; and means, coupled to the means for modifying, for storing one or more modified recognition unit models.

16. The trainer of claim 15 wherein the means for generating a misrecognition signal comprises means for forming a difference between:

a. the first recognizer scoring signal; and b. an average of the one or more other recognizer scoring signals.

17. The trainer of claim 15 wherein the means for modifying one or more of the current speech recognition unit model comprises:

a. means for determining a gradient of a function relating
 i. recognizer scoring of known speech based on a current recognition unit model for that speech to
 ii. recognizer scoring of known speech based on one or more other current recognition unit models; and b. means for adjusting one or more parameters of the current speech recognition unit models based on the gradient.

18. The trainer of claim 15 wherein the set of current recognition unit models comprises one or more hidden Markov models.

19. The trainer of claim 15 wherein the set of current recognition unit models comprises one or more templates.

20. The trainer of claim 15 wherein the current recognition unit models comprise the output of a recognition unit model trainer.

21. The trainer of claim 15 wherein the current recognition unit models comprise a modified set of recognition unit models.

22. The trainer of claim 15 further comprising:

means for recognizing an unknown speech signal based on current recognition unit models;

means for providing the recognized speech signal to be received as a known speech signal.

23. A speech recognition system comprising a. a feature extractor for receiving an unknown speech signal and identifying features characterizing the signal;

b. a first memory means for storing current recognition unit models;

c. a second memory means for storing known speech training samples;

d. a scoring comparator, coupled to the feature extractor and the first memory means, for comparing a plurality of current recognition unit models with one or more features of the unknown speech signal to determine a comparison score for each such model;

e. a score processor, coupled to the scoring comparator, for selecting the highest comparison score and recognizing speech based on the highest score; and f. a trainer, coupled to the first and second memory means, the trainer comprising:

i. means for generating a first recognizer scoring signal based on a known speech signal and a current recognition unit model for that signal;

ii. means, coupled to the means for generating a first recognizer scoring signal, for generating one or more other recognizer scoring signals, each such scoring signal based on the known speech signal and another current recognition unit model;

iii. means, coupled to the means for generating a first and other recognizer scoring signals, for generating a misrecognition signal based on the first and other recognizer scoring signals;

iv. means, coupled to the means for generating a misrecognition signal, for modifying one or more of the current recognition unit models, based on a value of a predetermined loss function when applied to the misrecognition signal and the known speech signal, to decrease the likelihood of misrecognizing an unknown speech signal; and v. means, coupled to the means for modifying, for storing one or more modified recognition unit models in the first memory means.

\* \* \* \* \*